US012578805B2

(12) United States Patent
Ooi et al.

(10) Patent No.: US 12,578,805 B2
(45) Date of Patent: Mar. 17, 2026

(54) INFORMATION HANDLING SYSTEM DISPLAY SEAMLESS KVM SWITCH

(71) Applicant: Dell Products L.P., Round Rock, TX (US)

(72) Inventors: Ghee Beng Ooi, Singapore (SG); Chih Hao Kao, Singapore (SG); Vui Khen Thien, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/584,532

(22) Filed: Feb. 22, 2024

(65) Prior Publication Data

US 2025/0271945 A1      Aug. 28, 2025

(51) Int. Cl.
| | |
|---|---|
| *G06F 3/023* | (2006.01) |
| *G06F 3/01* | (2006.01) |
| *G06F 3/0354* | (2013.01) |
| *G06F 13/42* | (2006.01) |

(52) U.S. Cl.
CPC .............. *G06F 3/023* (2013.01); *G06F 3/013* (2013.01); *G06F 3/03543* (2013.01); *G06F 13/4282* (2013.01); *G06F 2213/0016* (2013.01)

(58) Field of Classification Search
CPC .. G06F 3/013; G06F 3/14–1475; G06F 3/033; G06F 3/03541; G06F 3/03543; G06F 3/038; G06F 3/04812; G09G 2300/026; G09G 2360/04; G09G 2354/00; G09G 2360/00; G09G 2360/02; G09G 2360/06; G09G 2360/122; G09G 2370/00–24; G09G 5/12–14
See application file for complete search history.

(56) References Cited

U.S. PATENT DOCUMENTS

| | | | |
|---|---|---|---|
| 10,276,131 B2 | 4/2019 | Ballard et al. | |
| 10,664,292 B2 | 5/2020 | Puthillathe et al. | |
| 2002/0105553 A1* | 8/2002 | Segre ...................... | G06F 3/038 715/862 |
| 2004/0201544 A1* | 10/2004 | Love ..................... | G06F 3/1423 345/1.1 |
| 2007/0120763 A1* | 5/2007 | De Paepe ................. | G06F 3/14 345/1.3 |

(Continued)

OTHER PUBLICATIONS

Dell, "What is Dell Display Manager," downloaded from https://www.dell.com/support/kbdoc/en-us/000060112/what-is-dell-display-manager?ref=cpcl_us-en-bsd-fcca82af-9bb0-4ca0-a440-2bbb2a2cf418-dell-display-manager-support-dell_cta_link_forwindows#models on Feb. 21, 2024, 33 pages.

*Primary Examiner* — Roberto W Flores
(74) *Attorney, Agent, or Firm* — Zagorin Cave LLP; Robert W. Holland

(57) ABSTRACT

A display KVM switch interfaces with peripheral input devices, such as keyboard and a mouse, to selectively switch inputs from the input devices to one of plural information handling systems simultaneously presenting visual images at the display. A camera monitors a viewing position of the display to detect end user gaze at a first area of the display that shows first visual images of a first information handling system and at a second area of the display that shows visual images of a second information handling system. Inputs are switched between the information handling systems when a gaze is detected at an area presented by the information handling system after a predetermined time period.

20 Claims, 9 Drawing Sheets

(56) References Cited

U.S. PATENT DOCUMENTS

| | | | |
|---|---|---|---|
| 2012/0272179 A1* | 10/2012 | Stafford ............... | G06F 3/0482 |
| | | | 345/157 |
| 2016/0109946 A1* | 4/2016 | George-Svahn .... | G06F 3/04842 |
| | | | 345/156 |
| 2019/0121752 A1* | 4/2019 | Chen ...................... | H04N 7/142 |
| 2020/0050265 A1* | 2/2020 | Krishnakumar ........ | G06F 3/013 |
| 2020/0371664 A1* | 11/2020 | Krishnakumar ........ | G06F 3/013 |
| 2023/0251988 A1 | 8/2023 | Thien et al. | |
| 2023/0281885 A1* | 9/2023 | Park ...................... | G06V 10/94 |
| | | | 345/156 |
| 2023/0350501 A1 | 11/2023 | Yong et al. | |

* cited by examiner

70 — GAZE DETECTION VIA RGB CAMERA

72 — GAZE DIRECTION CHANGES AND GAZE IS HELD FOR 2 SECONDS

74 — ISP TOGGLES SCALAR VIA I$^2$C TO SWITCH USB INPUT

76 — SCALAR CHECKS PIP/PBP STATE

IN PIP/PBP MODE          NOT IN PIP/PBP MODE

78 — USB HUB SWITCHES TO THE OTHER PLATFORM

USB HUBS STAYS IN CURRENT PLATFORM — 80

FIG. 6B

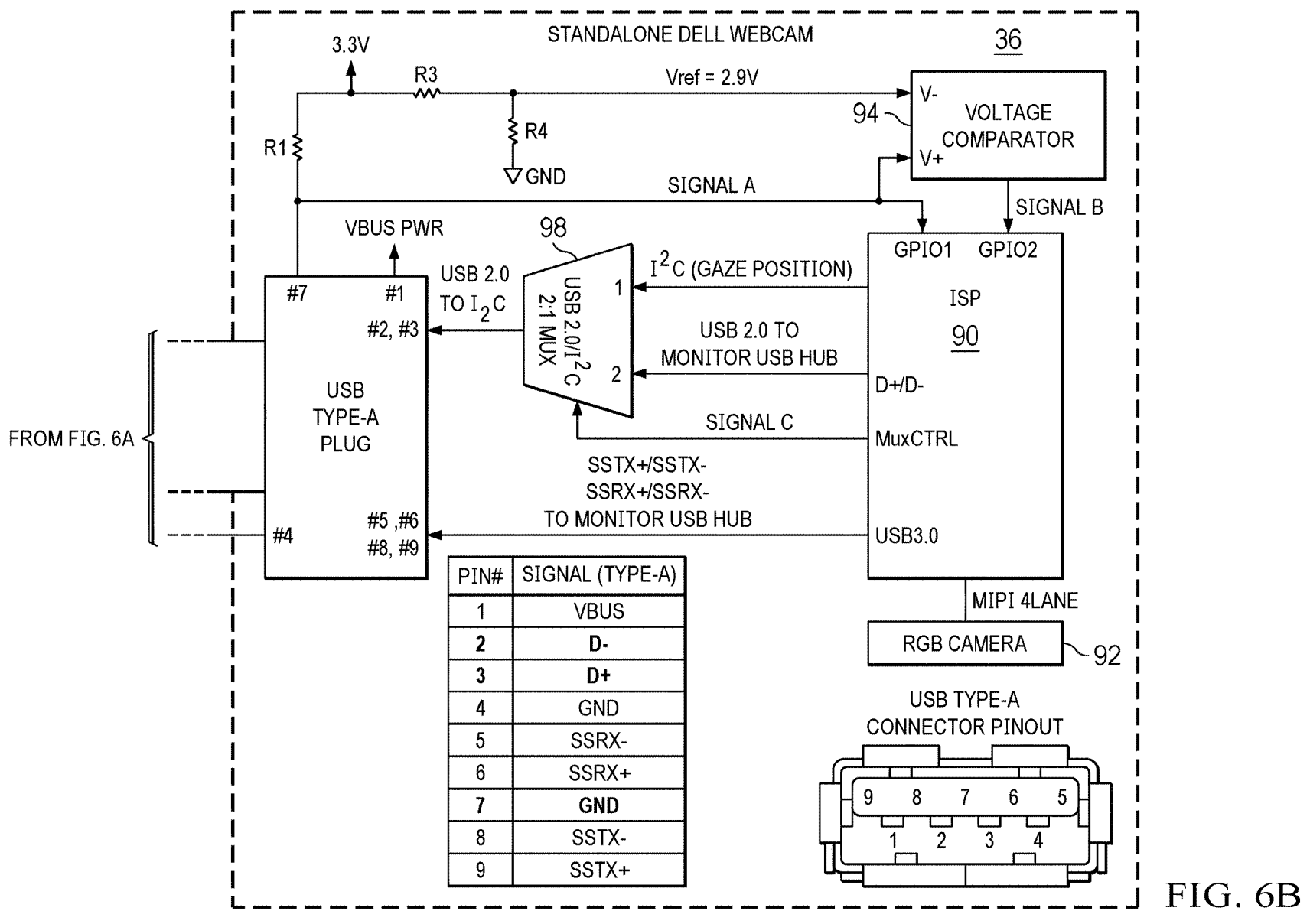

STANDALONE DELL WEBCAM    36

VOLTAGE COMPARATOR

Vref = 2.9V

94

SIGNAL B

V−
V+

GND

R4

R3

3.3V

R1

GPIO1    GPIO2

ISP    90

D+/D−

MuxCTRL

USB3.0

MIPI 4LANE

RGB CAMERA    92

SIGNAL A

I²C (GAZE POSITION)

USB 2.0 TO MONITOR USB HUB

SIGNAL C

SSTX+/SSTX−
SSRX+/SSRX−
TO MONITOR USB HUB 1    2

USB 2.0/I²C
2:1 MUX    98

VBUS PWR

USB 2.0
TO I²C

7    #1    #2, #3

USB TYPE-A PLUG

5, #6
8, #9

4

USB TYPE-A
CONNECTOR PINOUT

| PIN# | SIGNAL (TYPE-A) |
|------|-----------------|
| 1 | VBUS |
| 2 | D− |
| 3 | D+ |
| 4 | GND |
| 5 | SSRX− |
| 6 | SSRX+ |
| 7 | GND |
| 8 | SSTX− |
| 9 | SSTX+ |

FROM FIG. 6A

RULES:

1. R1, R2 DIVIDES PULL UP VOLTAGE SUCH THAT SIGNAL A IS 2.5V
2. R3, R4 DIVIDES 5V SUCH THAT Vref = 2.9V
3. TOTAL IMPEDANCE OF R1, R2, R3, R4 > 50 kΩ TO MINIMIZE CURRENT LEAKAGE
4. GPIO OF MUXES, ISP AND SCALER REQUIRES MIN. 2V FOR LOGIC H STATE
5. SIGNAL C = SIGNAL A XOR SIGNAL B

| RESISTOR | SELECTED VALUE |
|----------|----------------|
| R1 | 47 kΩ |
| R2 | 150 kΩ |
| R3 | 20 kΩ |
| R4 | 150 kΩ |

| UPSTREAM | DOWNSTREAM | PIN#7 STATE | SIGNAL A | SIGNAL B (A > 2.9V ?) | SIGNAL C (=A XOR B) | MUX STATE |
|---|---|---|---|---|---|---|
| DELL MONITOR | STD. USB3.x DEVICE | GND | 0V | NA | NA | USB 2.0 |
| | STD. USB2.0 DEVICE | NC | 0V | NA | NA | USB 2.0 |
| | DELL WEBCAM | DIVIDED BY R1 AND R2 | 2.5V | NA | NA | I²C |
| STD. USB3.x HOST/HUB | DELL WEBCAM | GND | 0V | L | L | USB 2.0 |
| STD. USB2.0 HOST/HUB | | NC | 3.3V | H | L | USB 2.0 |
| DELL MONITOR | | DIVIDED BY R1 AND R2 | 2.5V | L | H | I²C |

FIG. 8

INFORMATION HANDLING SYSTEM DISPLAY SEAMLESS KVM SWITCH

BACKGROUND OF THE INVENTION

Field of the Invention

The present invention relates in general to the field of information handling system displays, and more particularly to an information handling system display seamless KVM switch.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems integrate processing components that cooperate to process information, typically to present the information as visual images at a display. Portable information handling systems typically include a display and a power source in a portable housing to support mobile operations. Desktop information handling systems and other types of stationary systems typically interface with a peripheral display to present the information has visual images. Portable information handling systems also typically support presentation of visual images at peripheral displays. Often end users will prefer to present visual images at a peripheral display rather than an integrated display where a peripheral display typically has a greater display area and better display qualities. Often an end user will have a desktop information handling system in a work location, such as an enterprise cube, that interfaces with a peripheral display, peripheral keyboard and peripheral mouse, and a portable information handling system that the end user relies on when mobile. When the end user brings the portable information handling system to the work location, the end user may choose to interact through the desktop system or instead interface the portable system with the peripheral devices.

Keyboard, video, mouse (KVM) switches offer a convenient tool for an end user to selectively interact with peripheral devices through plural information handling systems. A KVM switch is a device that allows a user to control multiple information handling systems from one or more sets of keyboards, video monitors and mice. As an example, a keyboard and mouse will interface with a display so that each of plural information handling systems can interact with the keyboard, mouse and display when actively interfaced by the KVM switch. For instance an end user interfaces a portable system with a display and uses the KVM switch to select presentation of visual images from the portable system or from the desktop system. When the portable system presents visual images, inputs from the peripheral keyboard are switched to the portable system; when the desktop system presents visual images, inputs from the peripheral keyboard and mouse are switched to the desktop system. Configuration of the KVM switch is managed by logic executing on a processing resource of the display, such as display controller that presents configuration selections through an on screen display (OSD) menu. The OSD menu manages display settings that include input source and often support picture-in-picture (PIP) and picture-by-picture (PBP) modes to simultaneously show both the desktop and portable information handling system visual images.

One difficulty with implementation of a KVM switch in a display is that the OSD menu is difficult to interact with because an end user has to select the OSD menu from the display and interface with display buttons. DELL INC. offers a Dell Display Manager (DDM) software interface that runs in background to manage selection of inputs at peripheral devices to switch between information handling systems interfaced with a display. DDM determines input source information on a main display area and a sub-display area, such as a PIP/PBP area, from the display controller and detects a mouse cursor position relative to a boundary between two areas to assign the peripheral device inputs to the information handling systems. When a mouse cursor is close to a boundary of a display area for three seconds, DDM sends a virtual control panel (VCP) command to the display controller to toggle the USB switch so that peripheral inputs switch to the information handling system associated with the boundary.

SUMMARY OF THE INVENTION

Therefore, a need has arisen for a system and method which manages display KVM selection in an automated manner without OSD interactions.

In accordance with the present invention, a system and method are provided which substantially reduce the disadvantages and problems associated with previous methods and systems to select a display KVM switch information handling system destination for peripheral input device inputs. A camera monitors an area in front of a display to detect a predetermined gaze by an end user at the display. When the predetermined gaze is detected, a display controller of the display commands the KVM switch to interface an information handling system associated with the gaze and the peripheral input devices.

More specifically, plural information handling systems interface with a display to present visual images at plural areas of the display and accept inputs from input devices interfaced with a KVM switch of the display. A camera monitors an end user viewing the display and detects a predetermined end user gaze, such as at an area of the display that presents visual images of one of the plural information handling systems. In response to the predetermined gaze, the camera toggles a display controller of the display to command a switching of inputs at the KVM switch of input devices to the one of the plural information handling systems. A predetermined gaze at a second area of the display that presents visual images of a second information handling system commands a switch of the inputs to the second information handling system. The camera may be integrated with the display to interface with the display controller through an I2C interface. Alternatively, a peripheral display may interface with the display through a USB cable that repurposes the D+/D− pins to communicate as an I2C interface.

The present invention provides a number of important technical advantages. One example of an important technical advantage is that an end user can rapidly switch the information handling system receiving peripheral input device inputs from a display KVM switch by performing a predetermined gaze at the display which is detected by a camera of the display. The command to change the KVM switch interface does not require a manual input by an end user to the OSD menu of the display so that a seamless change of interactions between plural information handling systems is supported at a shared display.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 6A and 6B depict a circuit block diagram of a monitor display configured to manage input switching based upon eye gaze detection by a peripheral camera;

FIG. 8 depicts a table of pin states to manage gaze control from a peripheral camera interfaced with a peripheral display.

DETAILED DESCRIPTION

A display KVM switches inputs between plural information handling systems based upon detection of eye gaze by a camera directed at a viewing area of the display. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
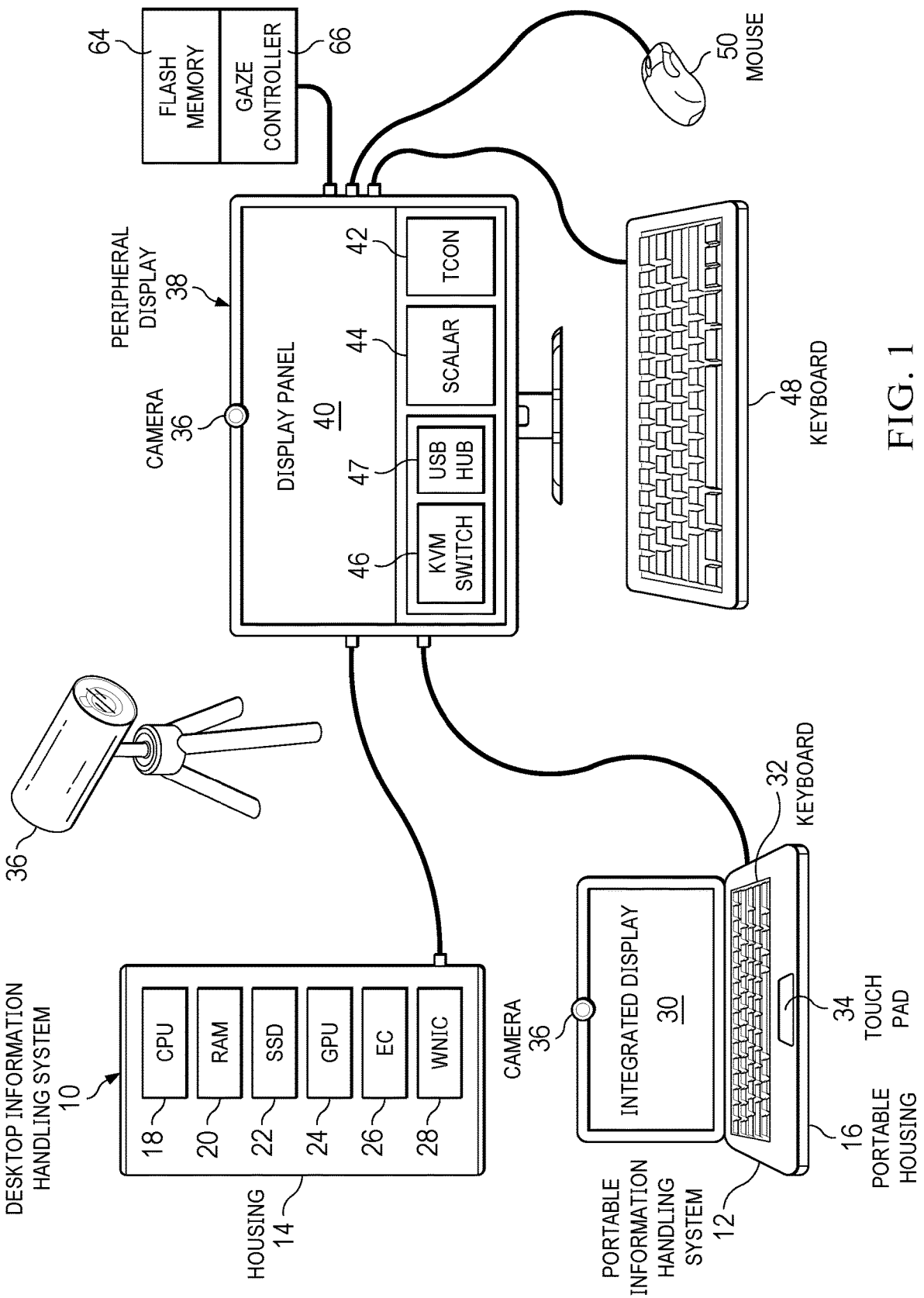
FIG. 1 depicts a display having a KVM switch configured to communicate inputs from input devices to a selected one of plural information handling systems based upon gaze detected from an end user towards an area of the display.

Referring now to FIG. 1, a display 38 is depicted having a KVM switch 46 configured to communicate inputs from input devices to a selected one of plural information handling systems 10 and 12 based upon gaze detected from an end user towards an area of the display. In the example embodiment a desktop information handling system 10 has a stationary housing 14 that supports processing components that cooperate to process information. A portable information handling system 12 has a portable housing 16 that supports the processing components in mobile use with integrated power and an integrated display 30. A central processing unit (CPU) 18 executes instructions to process information in cooperation with a random access memory (RAM) 20 that stores the information and instructions. A solid state drive (SSD) 22 provides persistent storage during power down, such as with flash memory that stores an operating system and applications. A graphics processing unit (GPU) 24 further processes information to generate visual images for presentation at a display, such as by defining pixel values. An embedded controller 26 manages physical operating conditions in the system, such as application of power and thermal constraints. A wireless network interface controller (WNIC) 28 supports network communications, such as WIFI and BLUETOOTH. Portable information handling system 12 includes an integrated keyboard 32 and touchpad 34 that accept end user inputs. Both information handling systems are configured to present visual images at a peripheral display 38 and to accept inputs from peripheral input devices, such as a peripheral keyboard 48 and a peripheral mouse 50.

In the example embodiment, peripheral display 38 interfaces with both desktop information handling system 10 and portable information handling system 12 to receive and present visual images from each. Visual images may be presented from only one information handling system or simultaneously from both, such as with PIP or PBP modes. A display controller 44, such as a scalar integrated circuit, includes a processing resource that cooperates with a timing controller 42 to present visual images at a display panel 40. A KVM switch 46 in cooperation with a USB hub 47 interfaces with peripheral input devices keyboard 48 and mouse 50 to selectively switch inputs to a selected one of the stationary information handling system 10 or portable information handling system 12 based upon the visual images that an end user is interacting with. KVM switch 46 switches between two different upstreams to go to separate information handling system, while USB hub 47 expands the connected KVM switch information handling system to interface with multiple peripherals. When an end user wants to interact with visual images of the desktop system, the end user can manually configure KVM switch 46 so that peripheral keyboard 48 and peripheral mouse 50 inputs are directed to the desktop system; when the end user changes to interact with visual images presented by the portable system, the end user can manually configure KVM switch 46 to send inputs to the portable system. Manual selections are performed through an on screen display user interface presented by display controller 44 and effectuated with a USB hub that is included with the KVM switch and interfaced with the information handling systems.

Display controller 44 interfaces with a flash memory 64 or other non-transitory memory to retrieve and execute a gaze controller 66 module of instructions. Gaze controller 66 interfaces with KVM switch 46 and camera 36 to determine an end user gaze relative to visual images presented at display panel 40 so that KVM switch 46 switches which one of the information handling systems receives inputs based upon the end user gaze. For example, if an end user gazes at an area of display panel 40 for a predetermined time, such as three seconds, display controller 44 commands KVM switch 46 to communicate inputs to the information handling system that presents the visual images. Cameras 36 may be RGB cameras that track facial characteristics to determine gaze or infrared cameras that determine gaze from an infrared reflection off an end user iris. The camera may be integrated in the peripheral display or interfaced as a peripheral camera. In one example embodiment, the camera may be integrated in the information handling system. As is described below in greater detail, the logic for performing KVM selection of the one information handling system that receives peripheral inputs at a time may be distributed between display controller 44, cameras 36 and the information handling systems. The peripheral display, peripheral camera, information handling systems and peripheral input devices may interface through cables, such as USB cables, or by wireless communication.

Figure 2:
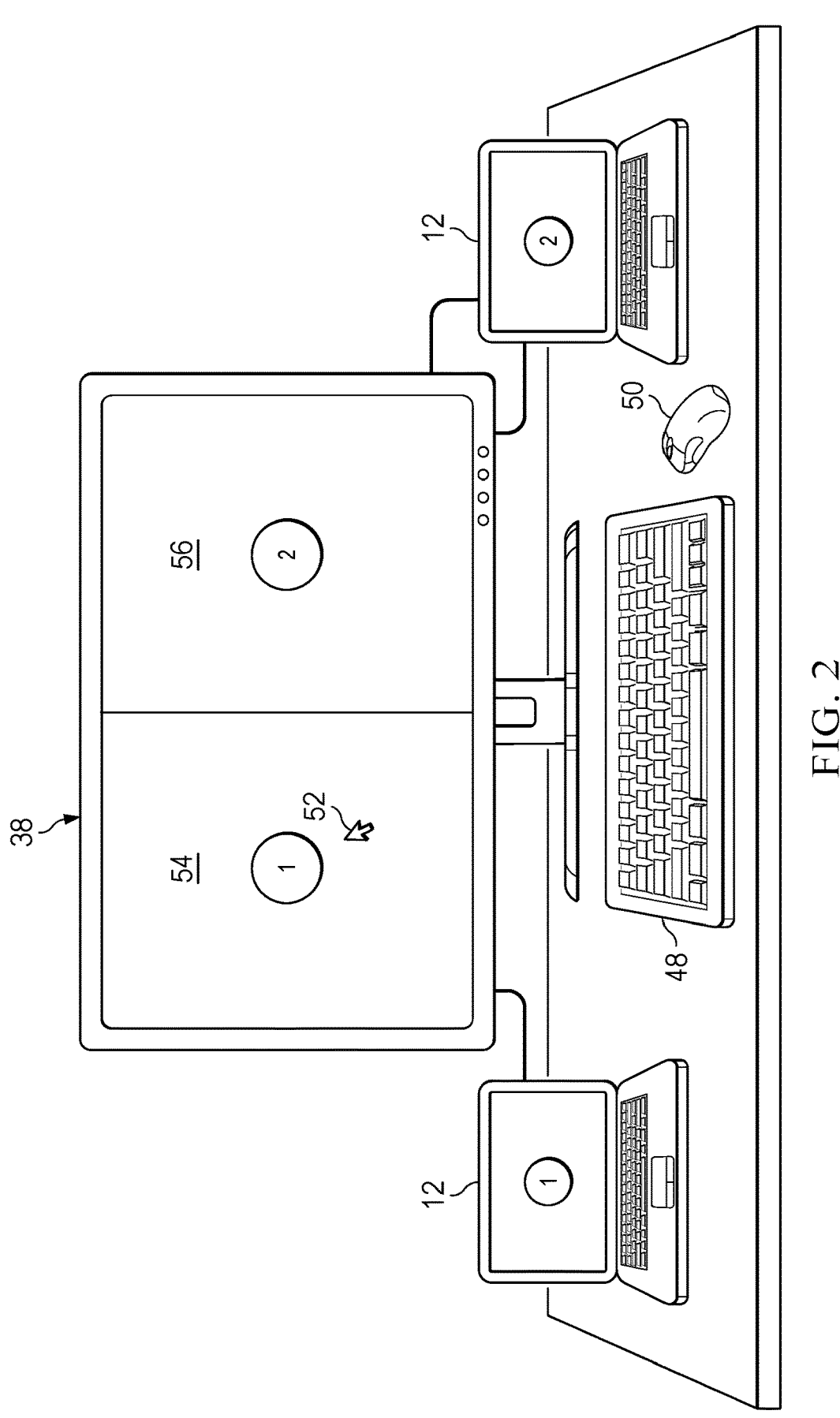
FIG. 2 depicts an example of the display presenting visual images of each of first and second information handling systems at one half of the display area and selectively switching inputs from input devices between the first and second information handling system based upon a gaze of an end user.

Referring now to FIG. 2, an example depicts the display 38 presenting visual images of each of first and second information handling systems at one half of the display area and selectively switching inputs from input devices between the first and second information handling system based upon a gaze of an end user. In the example embodiment, a first information handling system 12 presents visual images at a first area 54 of display 38 and a second information handling system 12 presents visual images at a second are 56 of display 38. Peripheral keyboard 48 and peripheral mouse 50 provide inputs to a KVM switch of display 38 that are forwarded to only one of the information handling systems 12 at a time. For instance, mouse cursor 52 may move across both areas 54 and 56 while mouse inputs are only provided to one of information handling systems 12 until an end user commands a change to the other information handling system 12. To command a change of the KVM switch to communicate inputs to a different one of the information handling systems, the end user gazes at an area 54 or 56 for a predetermined time, such as two to three seconds. In various embodiments, the time of the gaze may vary based upon different variables. For instance, certain contexts may have a larger time or smaller time for the gaze to command the KVM switch, such as based upon content presented by the visual images. A presentation of a movie content versus a word processing document may result in adjustments to the time or area for a gaze. Similarly, the size of the display areas may change the amount of time for a gaze at each area to switch the KVM inputs. In one embodiment, gaze control of the KVM switch may only execute when the display area is split in half between two information handling systems. Alternatively, a smaller or larger area for a visual image presentation at display 38 may result in a smaller or larger amount of time for a gaze to command a change at the KVM switch. In another alternative embodiment, a bias is placed towards the main display source and away from the PIP/PBP display source so that switching inputs to the main display source has a reduced gaze time that switching inputs to the PIP/PBP display source. In another example embodiment, a warning may be presented to an end user when a gaze is detected to command a switch of the peripheral input by the KVM switch so that the end user separately confirms the switch of peripheral inputs to a different information handling system, such as by a confirmatory click of a mouse or a key press.

Figure 3:
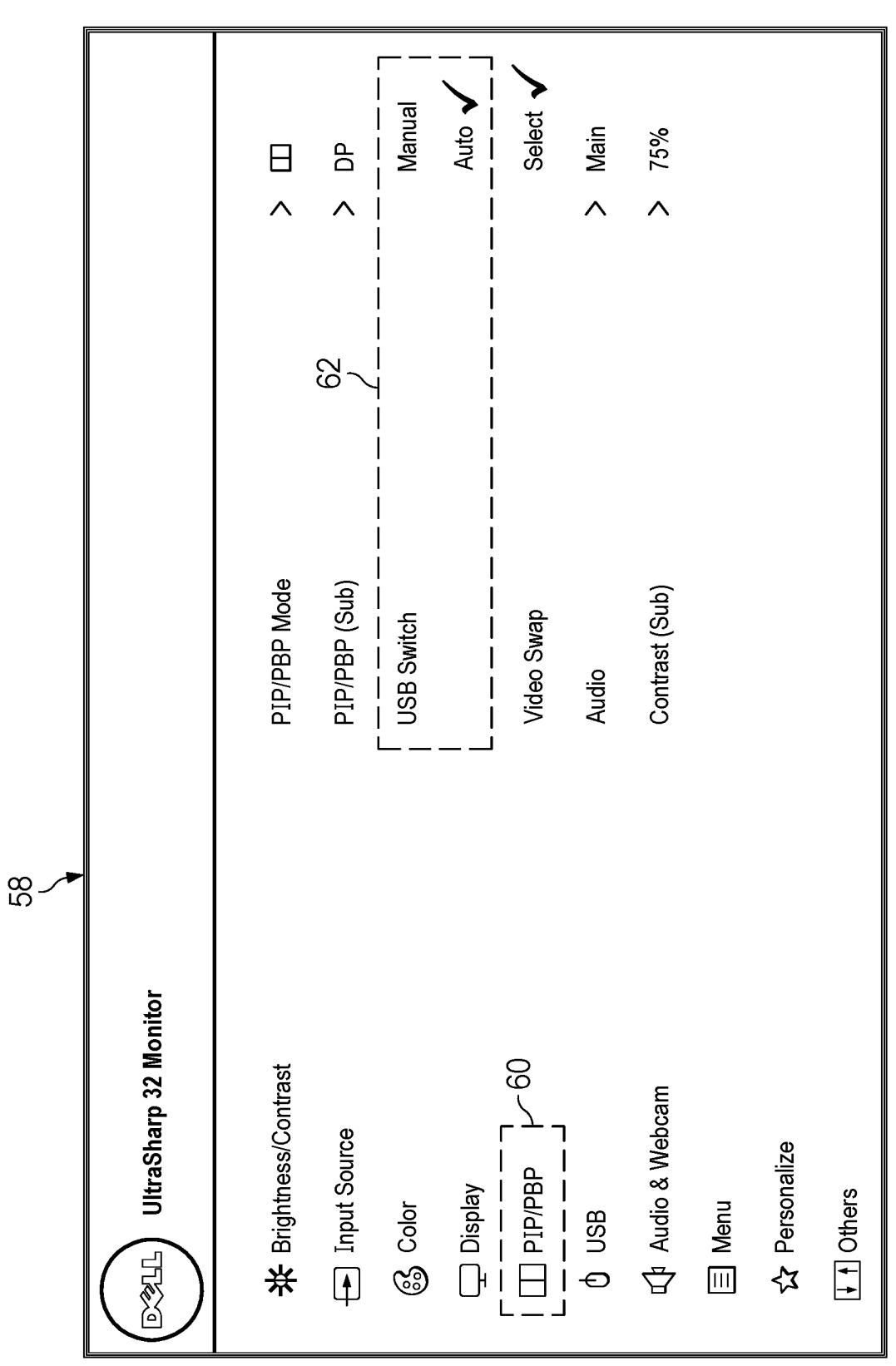
FIG. 3 depicts an on screen display menu to manage automatic selection of input device switching by a KVM based upon end user gaze.

Referring now to FIG. 3, an on screen display menu 58 is depicted that manages automatic selection of input device switching by a KVM based upon end user gaze. In the example embodiment, a selection of PIP/PBP 60 results in presentation at the display of visual images from plural information handling systems at the display, such as the 50/50 configuration shown in FIG. 2. The end user can then control which information handling system receives inputs from the peripheral input devices through a USB switch interface 62. One option is to simply select the KVM switch output manually by selecting which information handling system receives inputs through the USB hub. Alternatively, the end user may select an automated selection of KVM settings so that gaze control directs which information handling system receives inputs. Automated selection is performed with logic executing on the camera to detect gaze and logic executing on the display controller to determine when the gaze commands a change to the KVM switch between which one of the information handling systems receives inputs. This configuration automates KVM selection without having to load external software on the information handling system.

Figure 4:
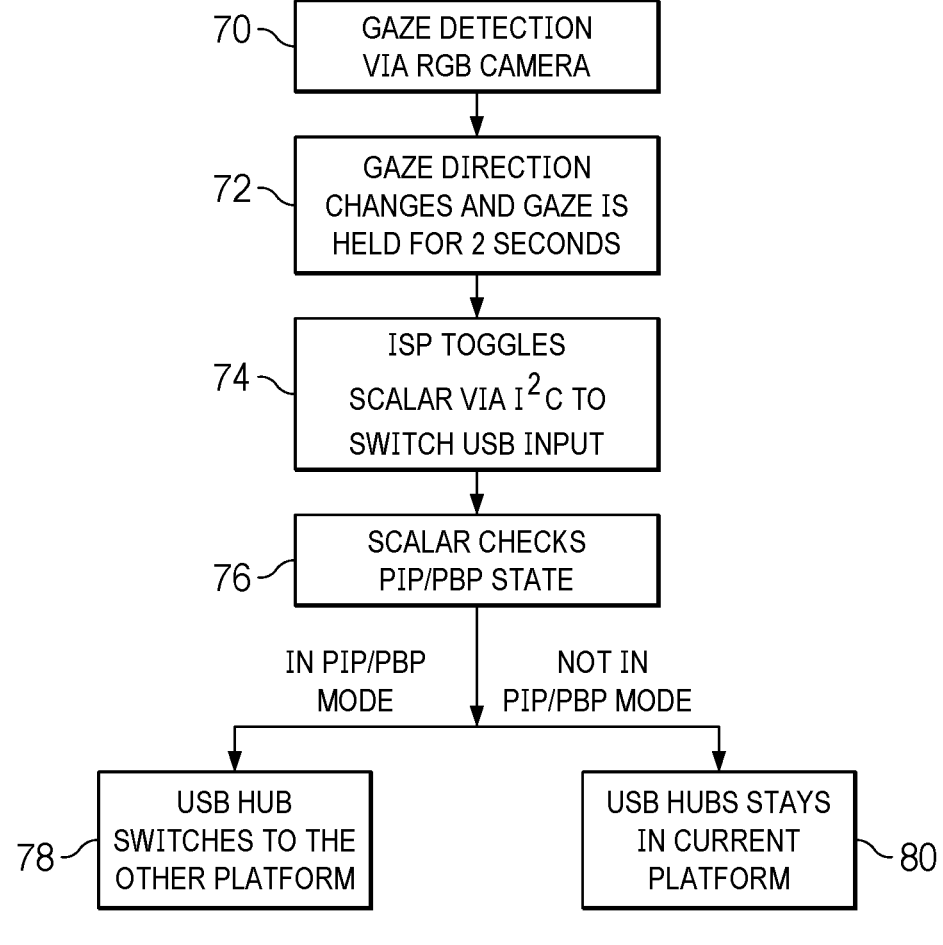
FIG. 4 depicts a flow diagram of a process for selection of one of plural information handling systems to interface with input devices through a KVM switch based upon eye gaze detection.

Referring now to FIG. 4, a flow diagram depicts a process for selection of one of plural information handling systems to interface with input devices through a KVM switch based upon eye gaze detection. The process starts at step 70 with gaze detection by an RGB camera of an end user at an area of the display. At step 72 the gaze detection changes to a new area and the gaze is held on the new area for a time period of two seconds. At step 74 the image sensor processor (ISP) of the camera toggles the display controller through an I2C communication to switch the USB hub input of the KVM switch from a first one of plural information handling systems to a second selected on of the plural information handling systems to receive inputs of the input devices. At step 76 in response to the toggle from the camera the display controller checks the PIP/PBP to determine if plural information handling systems are presenting visual images at the display. If the display is in the PIP/PBP mode, the process continues to step 78 to command the KVM USB hub switch to change the inputs to a different information handling system. If the display is not in the PIP/PBP mode, the process continues to step 80 to ignore the gaze toggle and maintain inputs switched to the current information handling system.

Figure 5:
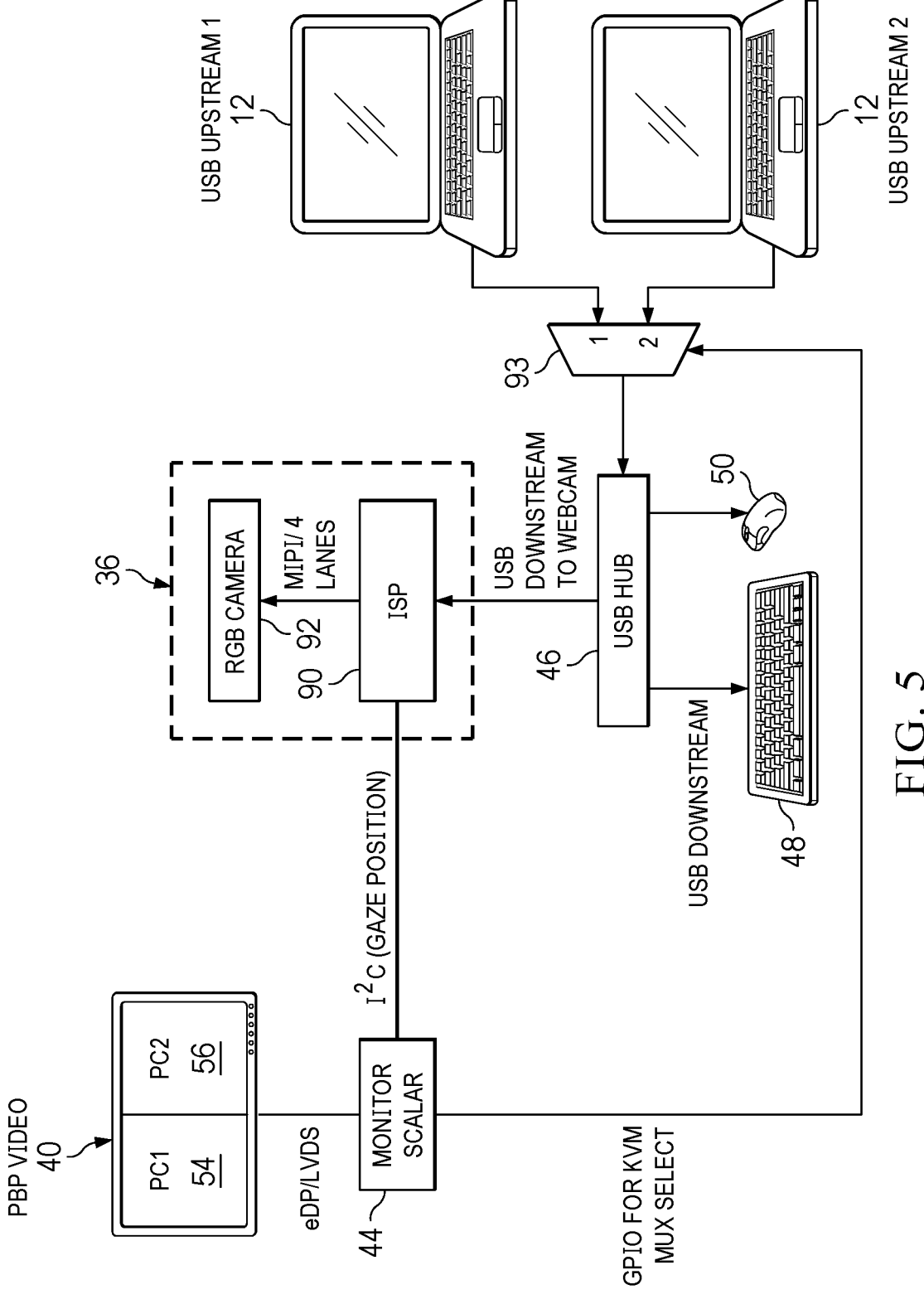
FIG. 5 depicts a circuit block diagram of a monitor display having a KVM switch managed by detection of eye gaze.

Referring now to FIG. 5, a circuit block diagram depicts a monitor display having a KVM switch managed by detection of eye gaze. A camera 36 with an RGP camera sensor 92 integrated in the peripheral display monitors a viewing area of the display with logic executing on an image sensor processor (ISP) 90 to identify when a predetermined gaze is performed by an end user viewing a display panel 40 that presents visual images in a first area 54 from a first information handling system 12 and in a second area 56 from a second information handling system 12. When ISP 90 detects a gaze, an I2C toggle command is communicated to display controller 44, which determines if multiple information handling systems are presenting visual images at display panel 40. If so, display controller 44 sends a command to a mux/demux 93 that interfaces with KVM switch 46, such as a USB hub, so that inputs from peripheral keyboard 48 and peripheral mouse 50 are directed to the information handling system 12 associated with the gaze. In one embodiment, the active input selection is forwarded to ISP 90 so that ISP 90 monitors the gaze to determine when a change in selection is indicated by the gaze.

Figure 6A:
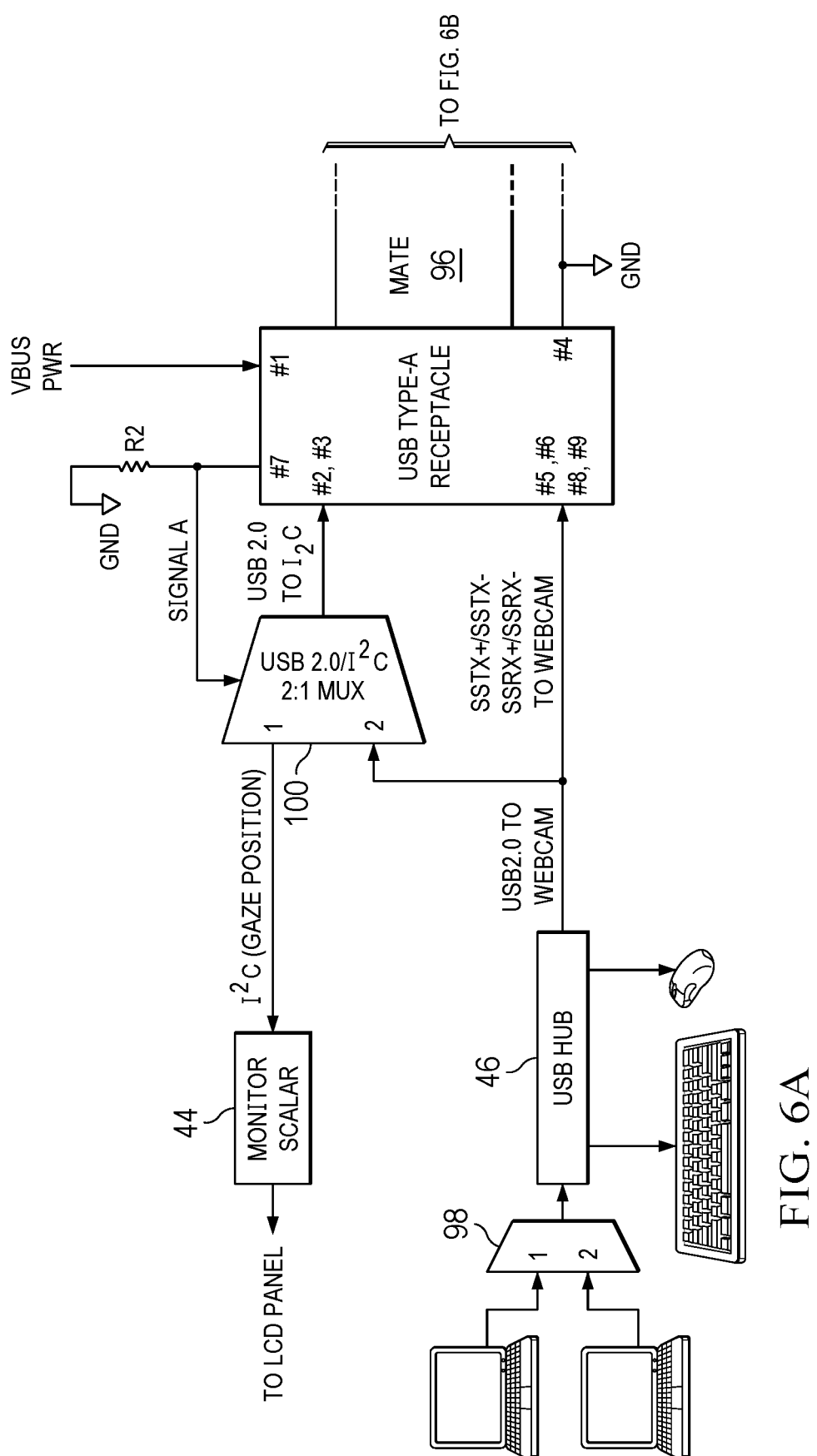

Referring now to FIGS. 6A and 6B, a circuit block diagram depicts a monitor display configured to manage input switching based upon eye gaze detection by an external peripheral camera. Peripheral camera 36 interfaces with the display through a USB connector mate 96, such as a USB Type A plug and receptacle have standard USB pins, such as pin 2 as D– and pin 3 as D+. ISP 90 monitors visual information from RGB camera sensor 92 to detect predetermined gazes as described above with respect to the integrated camera. Since the peripheral camera configuration does not offer a direct I2C interface with display controller 44, pins 2 and 3 are repurposed in cooperation with potential detection ground pin 7 to toggle display controller 44 when a gaze is detected by ISP 90. To ensure compatibility with the toggle command, 2:1 multiplexors 98 and 100 are provided on each side of port mate 96 so that an I2C command path is available. Multiplexors 98 and 100 only switch to provide the gaze toggle when the peripheral camera and display are both compatible with the gaze toggle command. For instance, compatibility is first determined by ground detect and then, if the camera and display are both compatible, gaze detect toggle is enabled at both multiplexors. Otherwise, the multiplexors 98 and 100 are set to operate compatible with the USB standard for the D– and D+ pins. In a standalone webcam, a voltage comparator 94 interfaced with a resistor divider circuit and the USB plug determines if the connected port partner is a compatible host that supports the gaze toggle command, or a standard USB 2.0 or USB Superspeed host.

Figure 7:
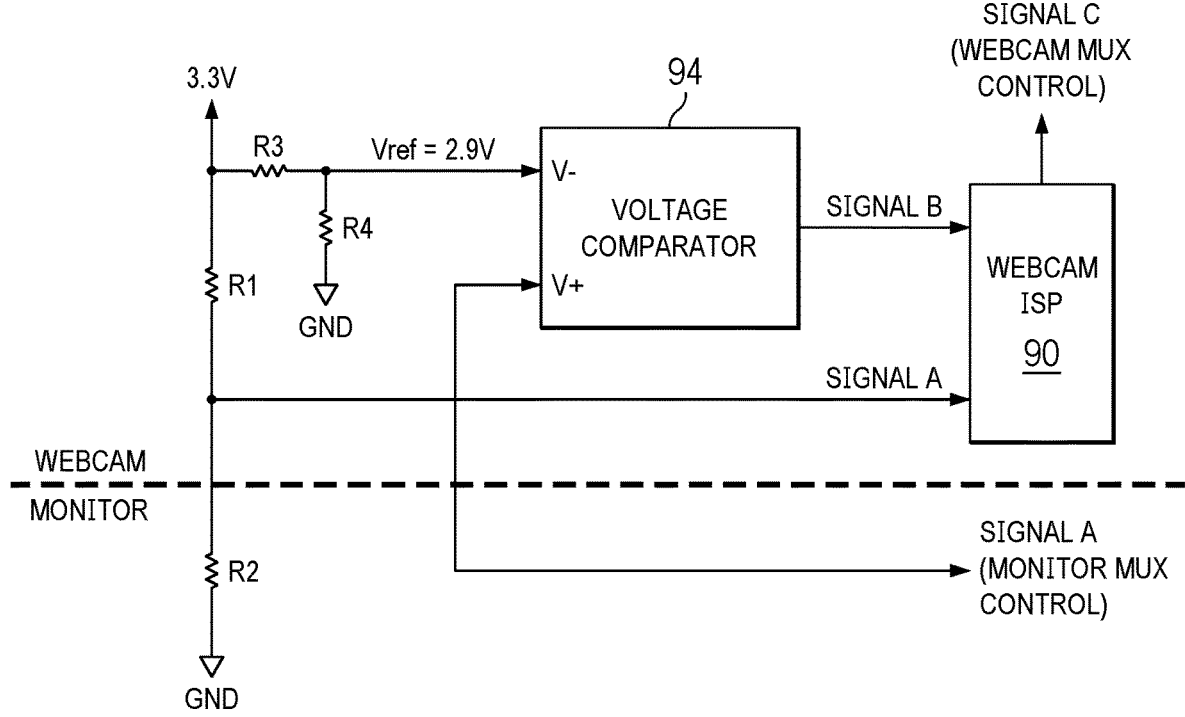
FIG. 7 depicts a resistor divider circuit to identify a peripheral camera as compatible with (+D/−D) I2C communication.

Referring now to FIG. 7, a resistor divider circuit is depicted to identify a peripheral camera as compatible with (+D/–D) I2C communication. In the example embodiment, R1 and R2 divide pull up voltage so that signal A to ISP 90 is 2.5V. R3 and R4 divide 5V so that V reference into voltage comparator 94 is 2.9V. The total impedance of R1, R2, R3 and R4 is greater than 50 kilohms to minimize voltage leak. The GPIO of the multiplexors shown in FIG. 6 and of ISP 90 and the display controller each require a minimum of 2V for logic to execute that permits the toggle of gaze detection by ISP 90. Signal C is a signal that signal A XOR signal B enables the toggle at the multiplexor.

Referring now to FIG. 8, a table of pin states is depicted to manage gaze control from a peripheral camera interfaced with a peripheral display. The table depicts voltage values generated by signals A, B and C, along with the multiplexor state that is commanded at the monitor and peripheral camera so that the gaze detection toggle is supported only when a compatible camera and display interface with each other. If incompatible camera and displays are detected, the system defaults to operation at standard USB values.

Although the present invention has been described in detail, it should be understood that various changes, substitutions and alterations can be made hereto without departing from the spirit and scope of the invention as defined by the appended claims.

What is claimed is:

1. An information handling system comprising:
a first housing having a first processor and a first memory cooperatively interfaced to execute instructions that process first information;
a second housing having a second processor and a second memory cooperatively interfaced to execute instructions that process second information;
a display interfaced with the first processor and the second processor to selectively present the first information as first visual images at a first area of the display and the second information as second visual images at a second area of the display;
a camera interfaced with the display and aligned to capture a visual image of an end user viewing the display;
a peripheral mouse interfaced with the display and operable to detect end user cursor inputs and communicate the cursor inputs to the display;
a switch coupled to the display and interfaced with the peripheral mouse, the switch operable to selectively communicate the cursor inputs to one of the first processor and the second processor;
a display controller coupled to the display to manage presentation of the first visual images and second visual images at the display, the display controller interfaced with the camera and the switch; and
a non-transitory memory interfaced with the display controller and storing instructions that when executed on the display controller cause the peripheral mouse cursor inputs to be communicated to the first processor when the camera captures a first predetermined end user gaze at the first visual images in the first area of the display for processing by the first processor across the entire display and to be communicated to the second processor when the camera captures a second predetermined end user gaze at the second visual images in the second area of the display for processing by the second processor across the entire display.

2. The information handling system of claim 1 further comprising:
a peripheral keyboard interfaced with the display and operable to detect end user key inputs and communicate the key inputs to the display; and
instructions stored in the non-transitory memory that when executed on the display controller cause the peripheral keyboard key inputs to be communicated to the first processor when the camera captures a first predetermined end user gaze at the first visual images and to be communicated to the second processor when the camera captures a second predetermined end user gaze at the second visual images.

3. The information handling system of claim 2 wherein the camera integrates with the display in a shared housing.

4. The information handling system of claim 2 wherein the camera integrates the first housing.

5. The information handling system of claim 2 wherein the camera interfaces with the display as a peripheral camera.

6. The information handling system of claim 5 further comprising a USB cable coupling the peripheral camera and display, the USB cable repurposing (D+/D–) pins to communicate an I2C transmission.

7. The information handling system of claim 1 wherein the first predetermined end user gaze comprises a first time of the end user gaze at the first visual images.

8. The information handling system of claim 7 wherein a length of the first time varies based upon content of the first visual images.

9. The information handling system of claim 7 wherein a length of the first time varies based upon an amount of the display at which the first visual images are presented compared with an amount of the display at which the second visual images are presented.

10. A method for managing inputs to an information handling system, the method comprising:

presenting visual images at a display in a first area from a first information handling system;

presenting visual images at the display in a second area from a second information handling system;

interfacing a peripheral input device to the display;

selecting the first information handling systems to receive inputs from the peripheral input device across the entire display when a predetermined end user gaze is detected at the first area; and selecting the second information handling system to receive inputs from the peripheral input device across the entire display when the predetermined end user gaze is detected at the second area.

11. The method of claim 10 further comprising:

detecting the end user gaze with a camera integrated in the display; and selecting the one of the first or second information handling systems based upon a predetermined time for the predetermined gaze at the one of the first area or the second area.

12. The method of claim 11 wherein the predetermined time varies based upon the context of visual images presented at the one of the first area or the second area.

13. The method of claim 11 wherein the predetermined time varies based upon the size of the first area compared against the size of the second area.

14. The method of claim 10 further comprising:

detecting the end user gaze with a peripheral camera separate from the display; and selecting the one of the first or second information handling systems based upon a predetermined time for the predetermined gaze at the one of the first area or the second area.

15. The method of claim 14 further comprising:

interfacing the peripheral camera with the display through a cable;

detecting the predetermined gaze with logic executing on a processing resource of the peripheral camera;

communicating the detecting of the predetermined gaze from the peripheral camera to a display controller of the display; and switching the peripheral input device to interface with one of the first or second information handling systems based upon the communicating.

16. The method of claim 15 further comprising repurposing (D+/D−) pins of a USB cable interface between the peripheral camera and display to communicate the detecting.

17. A system for managing inputs to an information handling system, the system comprising:

a display operable to simultaneously present visual images from plural information handling systems including at least first visual images of a first information handling system presented in a first area and second visual images of a second information handling system presented in a second area;

a camera interfaced with the display and aligned to capture a visual image of an end user viewing the display;

an input device interfaced with the display and operable to detect end user inputs and communicate the inputs to the display;

a switch coupled to the display and interfaced with the input device, the switch operable to selectively communicate the inputs to one selected of the plural information handling systems at a time;

a display controller coupled to the display to manage presentation of the visual images, the display controller interfaced with the camera and the switch; and a non-transitory memory interfaced with the display controller and storing instructions that when executed on the display controller cause the inputs to be communicated to the first information handling system across the entire display when the camera captures a first predetermined end user gaze at the first visual images in the first area and to be communicated to the second information handling system across the entire display when the camera captures a second predetermined end user gaze at the second visual images in the second area.

18. The system of claim 17 wherein the camera interfaces with the display as a peripheral camera through a USB cable, the camera determining the first end user gaze and the second end user gaze, the camera communicating detection of the first end user gaze and second end user gaze through (+D/−D) pins of the USB cable as an I2C signal.

19. The system of claim 17 wherein the instructions further:

present first visual images on a first area of the display from a first of the plural information handling systems;

present second visual images on a second area of the display from a second of the plural information handling systems; and switch the inputs between the first and second information handling systems when the camera detects a gaze for a predetermined amount of time at the first area or second area.

20. The system of claim 19 wherein the predetermined amount of time depends in part upon the content presented in the first area or the second area.

* * * * *